US009191446B2

United States Patent
Almog et al.

(10) Patent No.: US 9,191,446 B2
(45) Date of Patent: *Nov. 17, 2015

(54) MAINTAINING SESSION INITIATION PROTOCOL APPLICATION SESSION AFFINITY IN SIP CONTAINER CLUSTER ENVIRONMENTS

(71) Applicant: International Business Machines Corporation, Armonk, NY (US)

(72) Inventors: Noam Almog, Tel Aviv (IL); Craig A. Lanzen, Durham, NC (US); Nitzan Nissim, Tel-Aviv (IL); Brian Pulito, Lexington, KY (US); Asaf Zinger, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 13/826,016

(22) Filed: Mar. 14, 2013

(65) Prior Publication Data

US 2013/0326042 A1    Dec. 5, 2013

Related U.S. Application Data

(63) Continuation of application No. 13/486,156, filed on Jun. 1, 2012.

(51) Int. Cl.
*H04L 29/08* (2006.01)
*H04L 29/06* (2006.01)

(52) U.S. Cl.
CPC .......... *H04L 67/142* (2013.01); *H04L 65/1006* (2013.01)

(58) Field of Classification Search
None
See application file for complete search history.

(56) References Cited

U.S. PATENT DOCUMENTS

| | | | |
|---|---|---|---|
| 2007/0016662 A1 | 1/2007 | Desai et al. | |
| 2008/0256224 A1 | 10/2008 | Kaji et al. | |
| 2009/0187919 A1 | 7/2009 | Maes | |
| 2010/0057923 A1 | 3/2010 | Petter et al. | |
| 2011/0161518 A1 | 6/2011 | Burckart et al. | |
| 2011/0252127 A1 | 10/2011 | Iyengar et al. | |
| 2012/0096179 A1 | 4/2012 | Tombroff et al. | |
| 2012/0136984 A1 | 5/2012 | Wang et al. | |
| 2013/0326071 A1 | 12/2013 | Almog | |

OTHER PUBLICATIONS

IBM Software Group, "IBM WebSphere Application Server Feature Pack for Communications Enabled Applications", SIP servlet 1.1 specification overview (JSR 289), 2009, pp. 1-23.
Hendley et al., "SIP: Session Initiation Protocol", RFC 2543, 153 pages, Mar. 1999.

*Primary Examiner* — Khaled Kassim
*Assistant Examiner* — Zhaohui Yang
(74) *Attorney, Agent, or Firm* — Prentiss Johnson; SVL IPLaw Edell, Shapiro & Finnan, LLC

(57) ABSTRACT

A system for maintaining SIP application session affinity, the system including a destination inspector configured to inspect a SIP request to determine whether the SIP request indicates as its destination a logical name of a SIP container, a request router configured to route the SIP request to the SIP container that is identified by the logical name if the SIP request indicates as its destination the logical name of the SIP container, and a destination assignor configured to assign the SIP request to a SIP container in accordance with a predefined assignment protocol if the SIP request does not indicate as its destination the logical name of a SIP container.

11 Claims, 7 Drawing Sheets

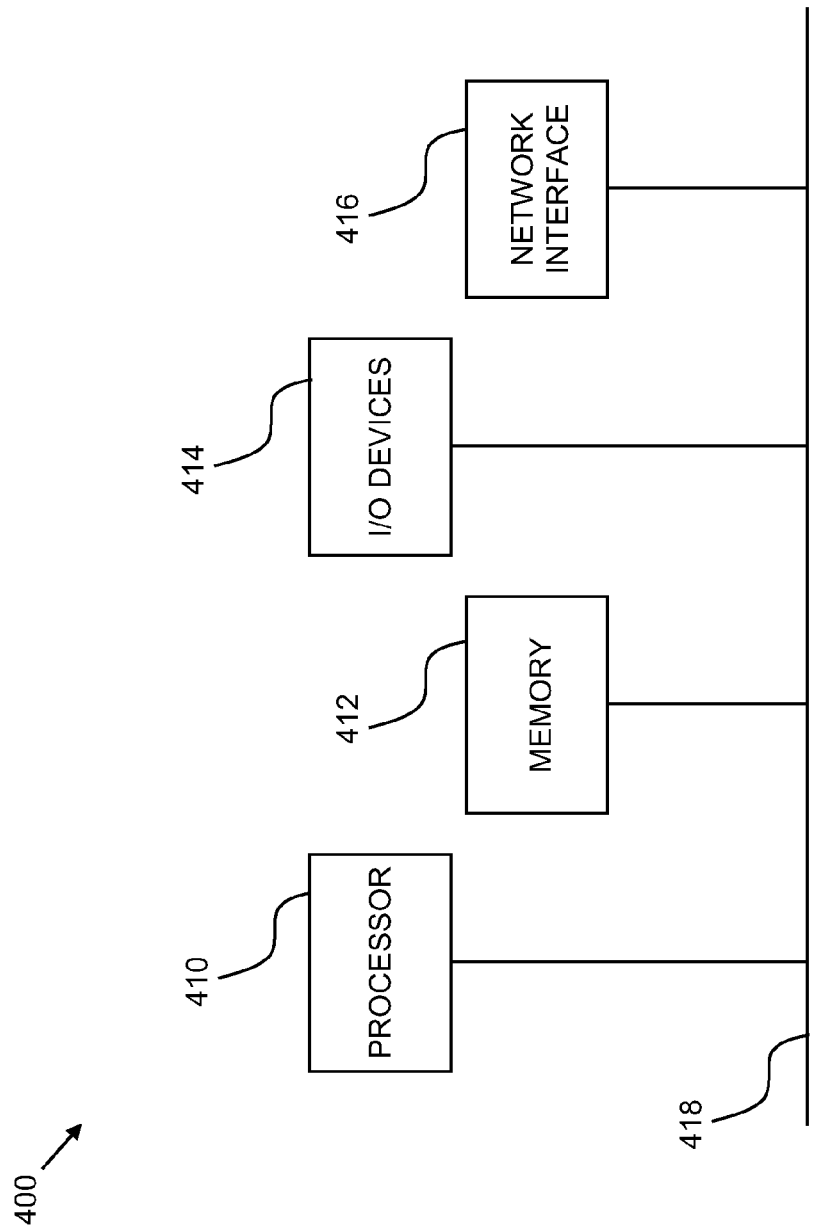

MAINTAINING SESSION INITIATION PROTOCOL APPLICATION SESSION AFFINITY IN SIP CONTAINER CLUSTER ENVIRONMENTS

CROSS REFERENCE TO RELATED APPLICATIONS

The present application claims priority to U.S. Nonprovisional Application No. 13/486,156, filed 1 Jun. 2012 and entitled "Maintaining Session Initiation Protocol Application Session Affinity in SIP Container Cluster Environments," the disclosure of which is incorporated herein by reference in its entirety.

BACKGROUND

The present invention relates to computer networks in general, and more particularly to computer networks supporting Session Initiation Protocol (SIP).

SIP is used to establish, manage, and terminate computer-network based multimedia communications. In IBM® WebSphere® Application Server, (commercially available from International Business Machines Corporation, Armonk, N.Y.), such communications, including IP telephony, presence, and instant messaging, may be provided in one or more SIP application sessions. (IBM and WebSphere are trademarks of International Business Machines Corporation, registered in many jurisdictions worldwide.) Thus, for example, two different computer network-based conference calls would be represented by separate SIP application sessions. A SIP application server includes one or more SIP containers that invoke and terminate SIP application sessions, and manage requests and responses that are sent and received in the context of SIP application sessions. Each participant in a SIP application session is represented by a separate SIP session. Thus, for example, a SIP application session representing a computer network-based conference call having multiple participants would have multiple SIP sessions associated with it, where a separate SIP session is associated with each participant.

A large computer network-based system that manages hundreds or thousands of separate SIP application sessions may employ one or more clusters of SIP containers hosted by one or more SIP application servers, where each cluster is served by a SIP proxy server, and where SIP session data is not centrally managed. A SIP proxy server typically maintains a list of SIP containers with which the SIP proxy server is associated, where each SIP container is further identified by one or more unique logical names. A SIP request that does not identify its destination using the logical name of a particular SIP container is typically assigned by the SIP proxy server to a SIP container in a cluster in accordance with an assignment protocol, such as in accordance with a load balancing plan. Conversely, a SIP request that does identify its destination using the logical name of a particular SIP container is simply routed by the SIP proxy server to the indicated SIP container. However, a SIP request that does not identify its destination using the logical name of a particular SIP container may nevertheless include an identifier that relates to a particular SIP application session that is managed by a particular SIP container. For example, the SIP request may include a telephone number or other identifier associated with a particular conference call. Unfortunately, as the SIP proxy server is only able to route a SIP request based on whether or not the SIP request identifies its destination using the logical name of a particular SIP container, there is no guarantee that the SIP proxy server will route the SIP request to the SIP container that is managing the SIP application session associated with the conference call.

SUMMARY

In one aspect of the invention a system is provided for maintaining SIP application session affinity, the system including a destination inspector configured to inspect a SIP request to determine whether the SIP request indicates as its destination a logical name of a SIP container, a request router configured to route the SIP request to the SIP container that is identified by the logical name if the SIP request indicates as its destination the logical name of the SIP container, and a destination assignor configured to assign the SIP request to a SIP container in accordance with a predefined assignment protocol if the SIP request does not indicate as its destination the logical name of a SIP container.

In another aspect of the invention a system is provided for maintaining SIP application session affinity, the system including a request inspector configured to inspect a SIP request to determine whether it is related to a SIP application, a key requestor configured to pass the SIP request to a session key-based targeting (SKBT) API of the SIP application, a key processor configured to evaluate a key returned by the SKBT API to determine a logical name owned by a SIP container, and a destination redirector configured to cause the SIP request to be routed to the SIP container that owns the logical name.

In other aspects of the invention methods and computer program products embodying the invention are provided.

BRIEF DESCRIPTION OF THE SEVERAL VIEWS OF THE DRAWINGS

The invention will be understood and appreciated more fully from the following detailed description taken in conjunction with the appended drawings in which:

FIG. 4 is a simplified block diagram illustration of an exemplary hardware implementation of a computing system, constructed and operative in accordance with an embodiment of the invention.

DETAILED DESCRIPTION OF THE INVENTION

Figure 1:
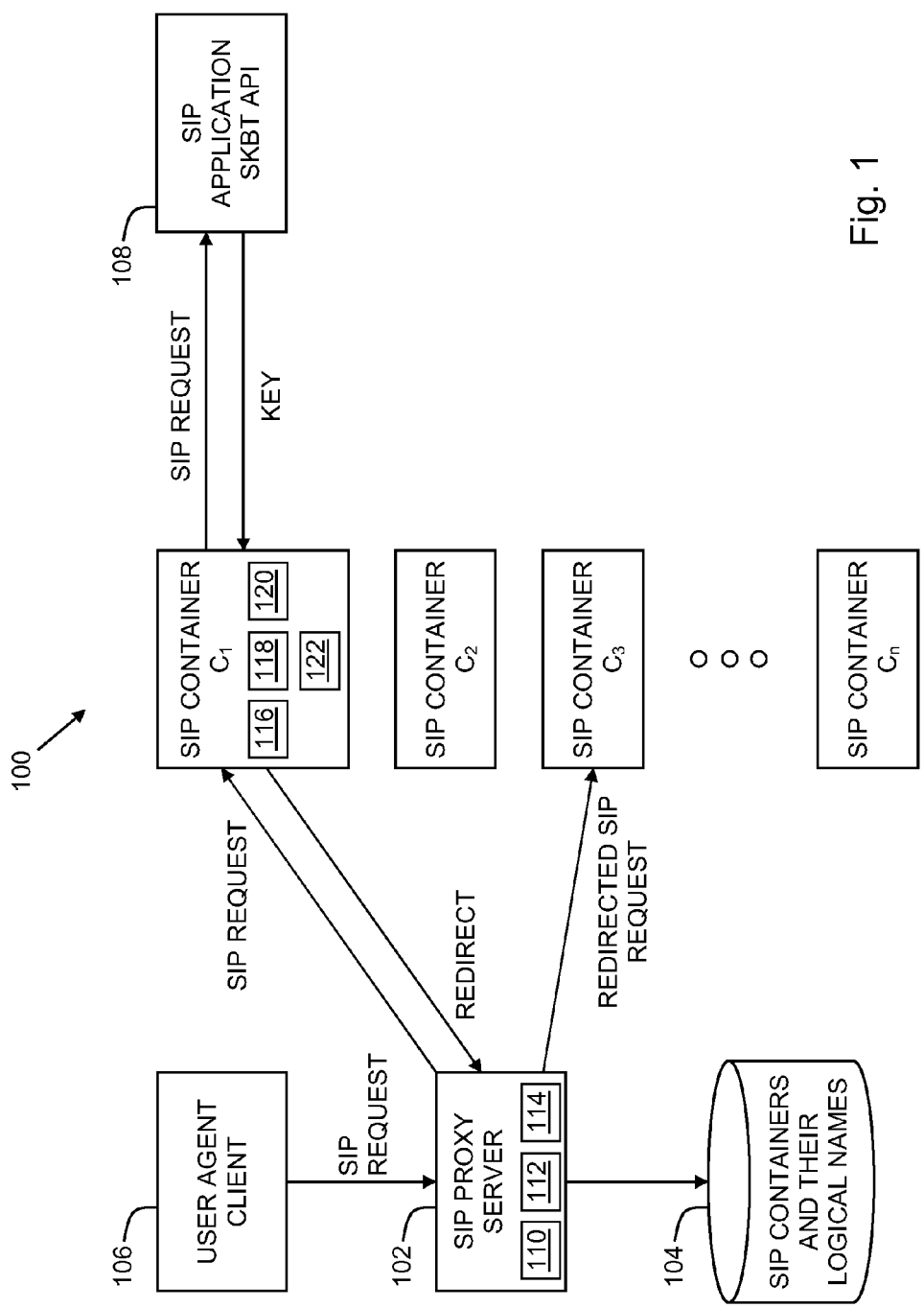
FIG. 1 is a simplified conceptual illustration of a system for maintaining SIP application session affinity in SIP container cluster environments, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for maintaining SIP application session affinity in SIP container cluster environments constructed and operative in accordance with an embodiment of the invention. In the system of FIG. 1, a cluster, generally designated 100, of SIP containers $C_1$-$C_n$ is served by a SIP proxy server 102. Each of the SIP containers in cluster 100 preferably has one or more logical names, and SIP proxy server 102 preferably maintains a list 104 of the SIP containers in cluster 100 and their logical names. SIP proxy server 102 is configured such that when it receives a SIP request, such as an INVITE request from a User Agent Client (UAC) 106, a destination inspector 110 configured with SIP proxy server 102 inspects the SIP request to determine whether or not SIP request indicates as its destination the logical name of a SIP container. If the SIP request indicates as its destination the logical name of a SIP container found in list 104, a request router 112 configured with SIP proxy server 102 preferably routes the SIP request to the SIP container that is identified by the logical name. If the SIP request does not indicate as its destination the logical name of a SIP container found in list 104, a destination assignor 114 configured with SIP proxy server 102 assigns the SIP request to a SIP container in cluster 100 in accordance with a predefined assignment protocol, such as where SIP proxy server 102 applies a predefined hash function modulo n to the Call-ID of the SIP request, where n is the number of logical names of SIP containers in cluster 100, giving the result m. Destination assignor 114 then assigns the SIP request to the SIP container associated with the m-th logical name of SIP containers in cluster 100.

Each SIP container in cluster 100 is preferably configured such that when it receives a SIP request, such as an INVITE request, a request inspector 116 configured with the SIP container inspects the SIP request to determine whether it is related to a particular SIP application and, if it is, a key requestor 118 configured with the SIP container passes the SIP request to a session key-based targeting (SKBT) API 108 of the SIP application, where the SIP application is installed on, or is otherwise accessible to, all of the SIP containers in cluster 100. SKBT API 108 creates a key from a SIP application session-specific identifier included in the SIP request (e.g., a telephone number of the conference call) and returns the key to the SIP container that invoked SKBT API 108. A key processor 120 configured with the SIP container applies a predefined hash function modulo n to the key, where n is the number of logical names of SIP containers in cluster 100, giving the result p. If one of the logical names of the SIP container that received the SIP request is the p-th logical name of SIP containers in cluster 100, then the SIP request has arrived at its proper destination. Otherwise, a destination redirector 122 configured with the SIP container that received the SIP request encodes the request URI of the SIP request to indicate the p-th logical name of SIP containers in cluster 100, where each SIP container in cluster 100 maintains a list of the other SIP containers in cluster 100 as well as their logical names. Destination redirector 122 configured with the SIP container that received the SIP request then resubmits the SIP request with the encoded request URI to SIP proxy server 102.

As previously stated, SIP proxy server 102 is preferably configured such that when it receives a SIP request, such as an INVITE request, destination inspector 110 configured with SIP proxy server 102 inspects the SIP request to determine whether or not SIP request indicates as its destination the logical name of a SIP container. Preferably, destination inspector 110 configured with SIP proxy server 102 performs this inspection by first determining whether the SIP request includes in an encoded request URI the logical name of a SIP container found in list 104. If such a logical name is found in an encoded request URI, request router 112 configured with SIP proxy server 102 routes the SIP request to the SIP container that owns the logical name. If such a logical name is not found in an encoded request URI, destination inspector 110 configured with SIP proxy server 102 determines whether the SIP request includes in a TO: field the logical name of a SIP container found in list 104. If such a logical name is found in a TO: field, request router 112 configured with SIP proxy server 102 routes the SIP request to the SIP container that owns the logical name.

It will be appreciated that for all SIP requests that are related to the same SIP application (e.g., a conferencing application) and that bear the same SIP application session-specific identifier (e.g., a telephone number of a conference call), SKBT API 108 will generate the same key, and since the key will always hash to the same logical name of a SIP container, this ensures that all SIP requests that are related to the same SIP application session will ultimately be routed to the same SIP container, even if they are initially routed to a different SIP container. The SIP container may then service the SIP request in accordance with conventional techniques, such as by initiating a SIP application session if required, creating a SIP session for the requestor, and associating the SIP session with the SIP application session.

Any of the elements shown in FIG. 1 are preferably implemented by one or more computers in computer hardware and/or in computer software embodied in a non-transient, computer-readable medium in accordance with conventional techniques.

Figure 2A:
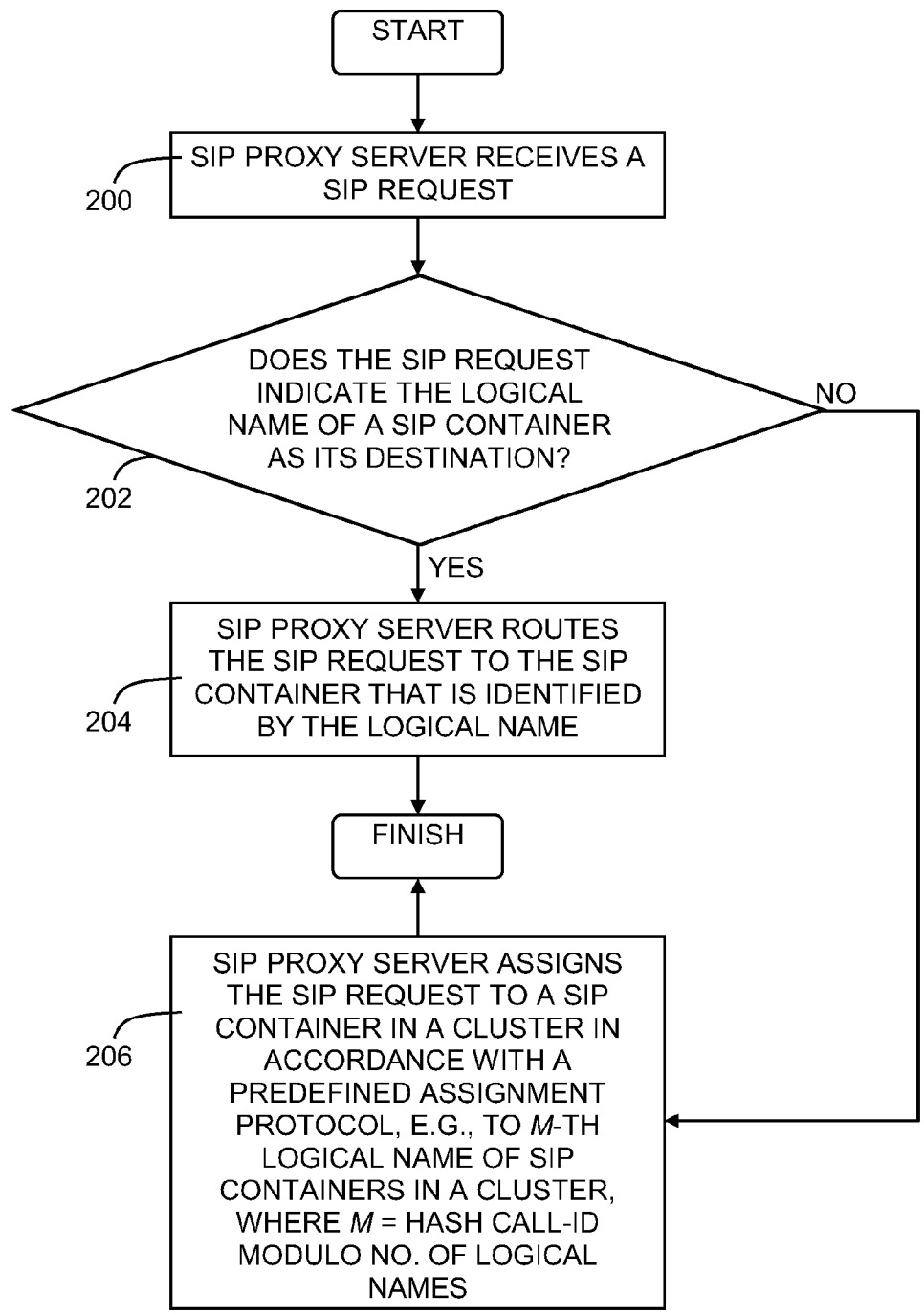
FIGS. 2A-2C are simplified flowchart illustrations of exemplary methods of operation of aspects of the system of FIG. 1, operative in accordance with embodiments of the invention.
Figure 2B:
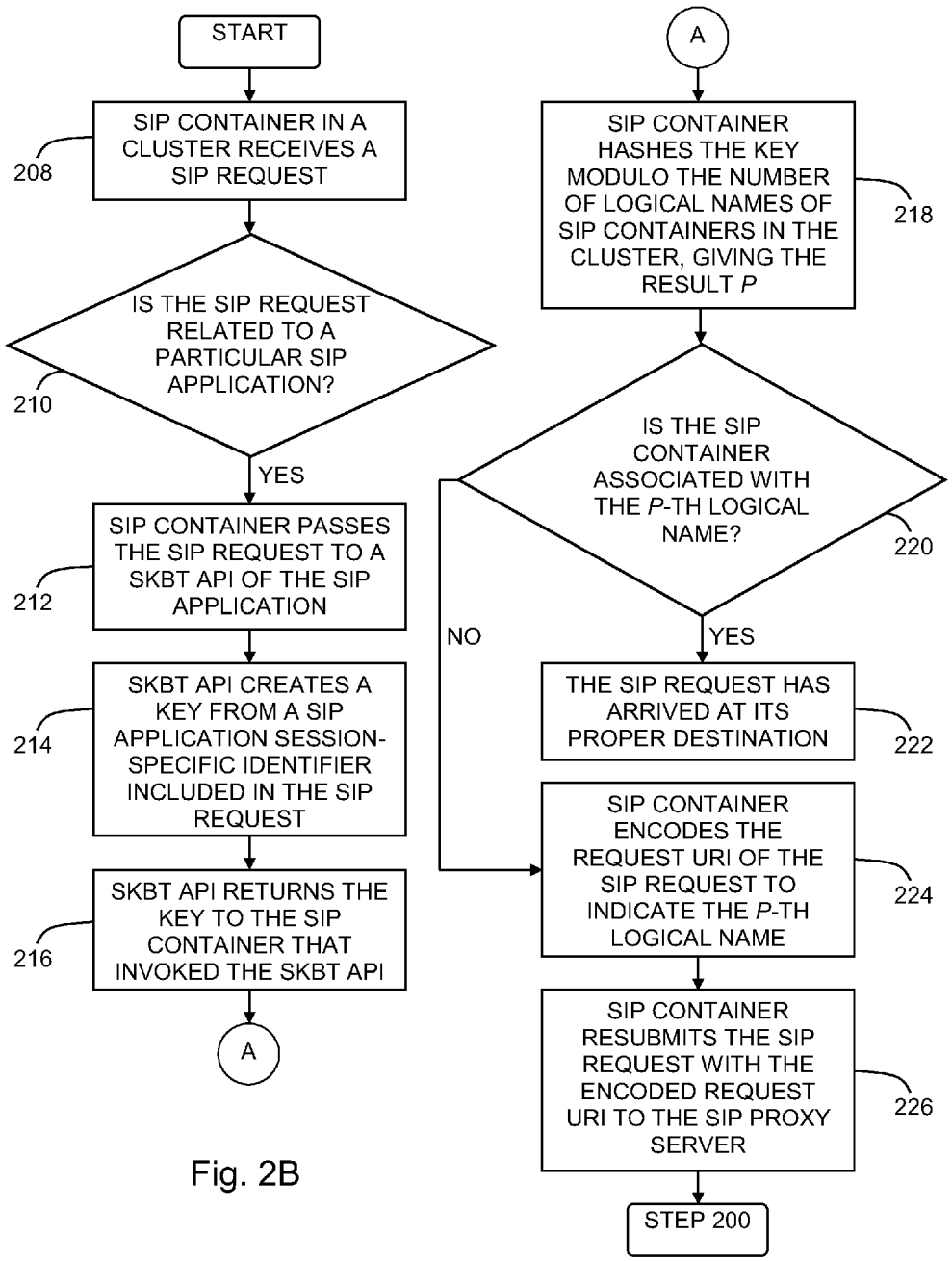
Figure 2C:
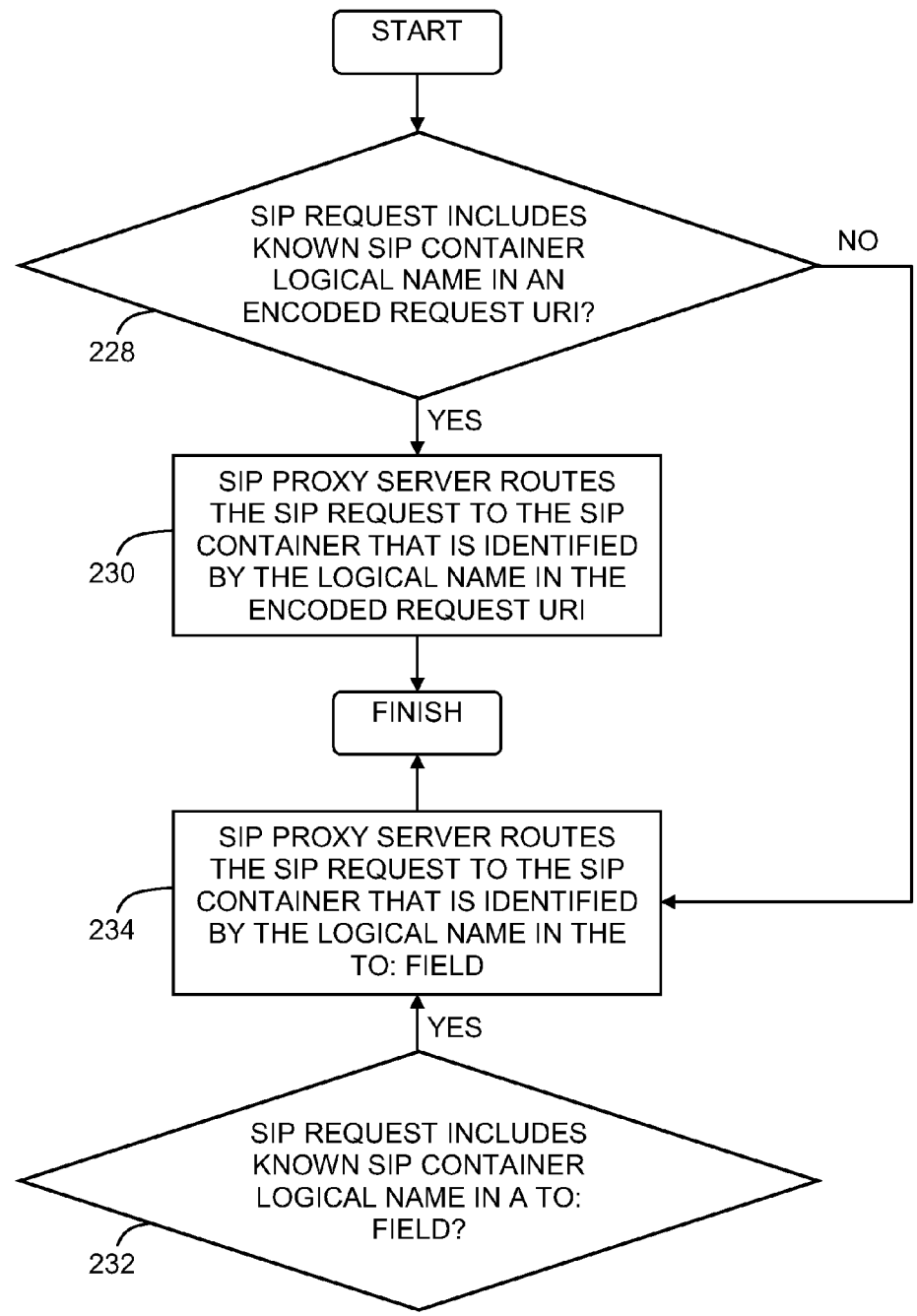

Reference is now made to FIGS. 2A-2C, which are simplified flowchart illustrations of exemplary methods of operation of aspects of the system of FIG. 1, operative in accordance with embodiments of the invention. In the method of FIG. 2A, when a SIP proxy server receives a SIP request, such as an INVITE request from a User Agent Client (step 200), the SIP proxy server inspects the SIP request to determine whether or not SIP request indicates as its destination the logical name of a SIP container (step 202). If the SIP request indicates as its destination the logical name of a SIP container known to the SIP proxy server, the SIP proxy server routes the SIP request to the SIP container that is owns the logical name (step 204). If the SIP request does not indicate as its destination the logical name of a SIP container known to the SIP proxy server, the SIP proxy server assigns the SIP request to a SIP container in a cluster in accordance with a predefined assignment protocol, such as where the SIP proxy server applies a predefined hash function modulo n to the Call-ID of the SIP request, where n is the number of logical names of SIP containers in the cluster, giving the result m, and assigns the SIP request to the SIP container associated with the m-th logical name of SIP containers in the cluster (step 206).

In the method of FIG. 2B, when a SIP container in the cluster receives a SIP request (step 208), such as an INVITE request, the SIP container inspects the SIP request to determine whether it is related to a particular SIP application (step 210) and, if it is, the SIP container passes the SIP request to a session key-based targeting (SKBT) API of the SIP application (step 212), where the SIP application is installed on, or is otherwise accessible to, all of the SIP containers in the cluster. The SKBT API creates a key from a SIP application session-specific identifier included in the SIP request (e.g., a telephone number of the conference call) (step 214) and returns the key to the SIP container that invoked the SKBT API (step 216). The SIP container applies a predefined hash function modulo n to the key, where n is the number of logical names of SIP containers in the cluster, giving the result p (step 218). If the logical name of the SIP container that received the SIP request owns the p-th logical name of SIP containers in the cluster, then the SIP request has arrived at its proper destination (steps 220, 222). Otherwise, the SIP container that received the SIP request encodes the request URI of the SIP request to indicate the p-th logical name of SIP containers in the cluster (step 224), where each SIP container in the cluster maintains a list of the other SIP containers in the cluster as well as their logical names. The SIP container that received the SIP request then resubmits the SIP request with the encoded request URI to the SIP proxy server (step 226), whereupon processing preferably returns to step 200.

In the method of FIG. 2C, when a SIP proxy server receives a SIP request, such as an INVITE request, and inspects the SIP request to determine whether or not SIP request indicates as its destination the logical name of a SIP container as in step 202 above, the SIP proxy server preferably performs this inspection by first determining whether the SIP request includes in an encoded request URI the logical name of a SIP container known to the SIP proxy server (step 228). If such a logical name is found in an encoded request URI, the SIP proxy server routes the SIP request to the SIP container that owns the logical name (step 230). If such a logical name is not found in an encoded request URI, the SIP proxy server determines whether the SIP request includes in a TO: field the logical name of a SIP container known to the SIP proxy server (step 232). If such a logical name is found in a TO: field, the SIP proxy server routes the SIP request to the SIP container that owns the logical name (step 234).

Figure 3A:
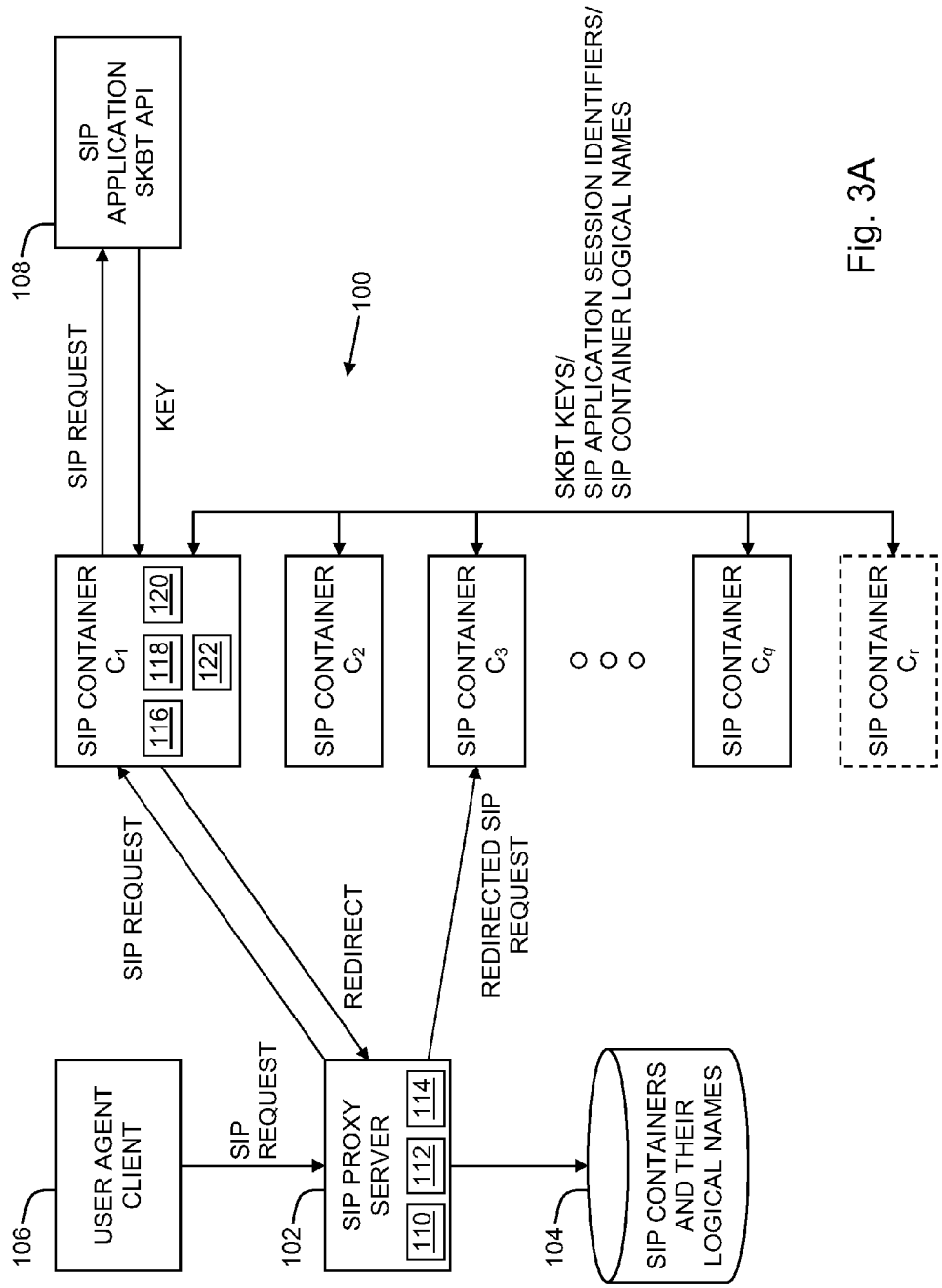
FIG. 3A is a simplified conceptual illustration of a system for maintaining SIP application session affinity in SIP container cluster environments constructed and operative in accordance with an embodiment of the invention.

Reference is now made to FIG. 3A, which is a simplified conceptual illustration of a system for maintaining SIP application session affinity in SIP container cluster environments constructed and operative in accordance with an embodiment of the invention. The system of FIG. 3A incorporates the elements of the system of FIG. 1, while providing additional functionality as follows. When the number of logical names known to SIP proxy server 102 increases from q to q+r, such as when a new SIP container is added to the cluster, request router 112 of SIP proxy server 102 preferably suspends routing SIP requests to SIP containers 100 in the cluster until each SIP container 100 in the cluster provides the other SIP containers 100 in the cluster with a list of the SKBT keys received by the SIP container for SIP application sessions managed by the SIP container, mapped to the SIP application session identifiers and SIP container logical names to which the SKBT keys relate. Thereafter, request router 112 of SIP proxy server 102 preferably resumes routing SIP requests to SIP containers 100 in the cluster. When a SIP container 100 receives a SIP request that is related to a SIP application session and receives an SKBT key from the SKBT API as previously described, key processor 120 of the SIP container searches for the SKBT key in its SKBT key/SIP application session ID/SIP container logical name mapping. If the SKBT key maps to a SIP application session that the SIP container is currently managing, then the SIP request has arrived at the correct SIP container. If the SKBT key maps to a SIP application session that is being managed by another SIP container, then, as previously described, destination redirector 122 modifies the request URI of the SIP request header to indicate the logical name of the SIP container to which the SIP request is to be routed, and sends the SIP request back to SIP proxy server 102 for rerouting. And if the SKBT key does not map to an existing SIP application session, then it is hashed modulo q+r by key processor 120 and routed by destination redirector 122 to the appropriate container as previously described, whereupon the SIP application session is created.

Figure 3B:
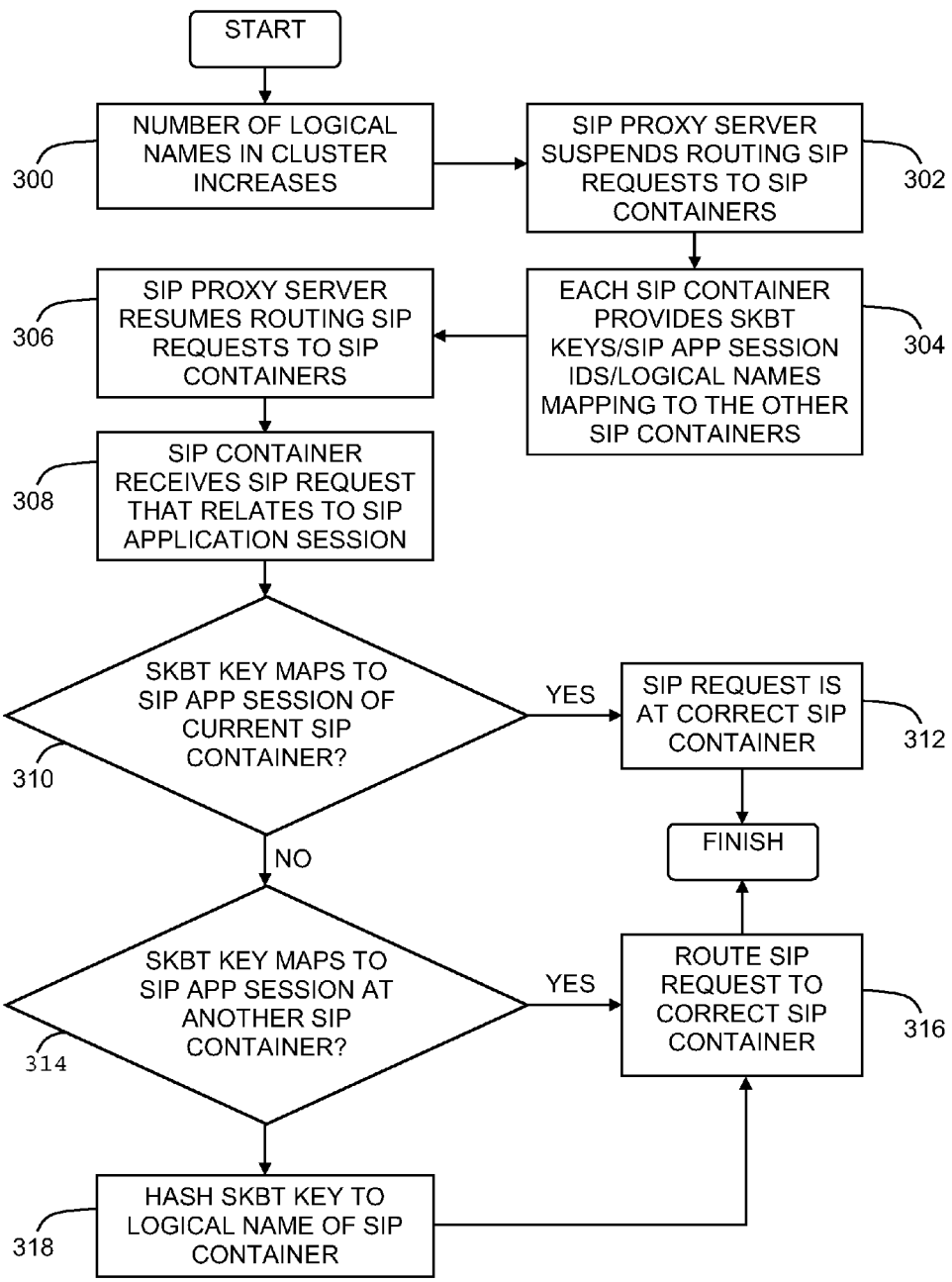
FIG. 3B is a simplified flowchart illustration of an exemplary method of operation of the system of FIG. 3B, operative in accordance with embodiments of the invention.

Reference is now made to FIG. 3B, which is a simplified flowchart illustration of an exemplary method of operation of the system of FIG. 3A, operative in accordance with an embodiment of the invention. In the method of FIG. 3B, when the number of logical names known to the SIP proxy server increases from q to q+r (step 300), such as when a new SIP container is added to the cluster, the SIP proxy server preferably suspends routing SIP requests to SIP containers in the cluster (step 302) until each SIP container in the cluster provides the other SIP containers in the cluster with a list of the SKBT keys received by the SIP container for SIP application sessions managed by the SIP container, mapped to the SIP application session identifiers and SIP container logical names to which the SKBT keys relate (step 304). Thereafter, the SIP proxy server preferably resumes routing SIP requests to SIP containers in the cluster (step 306). When a SIP container receives a SIP request that is related to a SIP application session (step 308) and receives an SKBT key from the SKBT API as previously described, the SIP container searches for the SKBT key in its SKBT key/SIP application session ID/SIP container logical name mapping. If the SKBT key maps to a SIP application session that the SIP container is currently managing, then the SIP request has arrived at the correct SIP container (steps 310, 312). If the SKBT key maps to a SIP application session that is being managed by another SIP container, then, as previously described, the request URI of the SIP request header is modified to indicate the logical name of the SIP container to which the SIP request is to be routed, and the SIP request is sent back to the SIP proxy server for rerouting (step 314, 316). And if the SKBT key does not map to an existing SIP application session, then it is hashed modulo q+r and routed to the appropriate container as previously described, whereupon the SIP application session is created (step 318).

Referring now to FIG. 4, block diagram 400 illustrates an exemplary hardware implementation of a computing system in accordance with which one or more components/methodologies of the invention (e.g., components/methodologies described in the context of FIGS. 1-3W) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for maintaining Session Initiation Protocol (SIP) application session affinity, the method comprising:
    inspecting a SIP request associated with an application session to determine a presence within the SIP request of a logical name of a destination SIP container among a plurality of SIP containers;
    routing the SIP request to the destination SIP container in response to the SIP request including the logical name of the destination SIP container;
    assigning the SIP request to a determined SIP container among the plurality of SIP containers in accordance with a predefined assignment protocol in response to an absence of the logical name of the destination SIP container in the SIP request;
    receiving the SIP request at the determined SIP container without the logical name of the destination SIP container and determining at the determined SIP container a related SIP application, wherein the SIP request includes a session identifier for an application session of the related SIP application managed by a session SIP container of the plurality of SIP containers; and
    determining at the determined SIP container the session SIP container managing the application session of the SIP request based on application of a function to a value based on the session identifier and causing the SIP request to be routed from the determined SIP container to the session SIP container in response to the application session being managed by other than the determined SIP container.

2. The method according to claim 1 wherein the inspecting comprises determining whether the SIP request includes in an encoded request uniform resource identifier (URI) the logical name of the session SIP container, and wherein the routing comprises routing the SIP request to the session SIP container that owns the logical name found in the encoded request URI.

3. The method according to claim 1 wherein the inspecting comprises determining whether the SIP request includes in a TO: field the logical name of the session SIP container when the SIP request lacks in an encoded request uniform resource identifier (URI) the logical name of the session SIP container, and wherein the routing comprises routing the SIP request to the session SIP container that owns the logical name found in the TO: field.

4. The method according to claim 1 wherein the assigning step comprises:
    applying a predefined hash function modulo n to a Call-ID of the SIP request giving a result m, where n is a number of known logical names of determined SIP containers; and
    assigning the SIP request to the determined SIP container associated with the m-th logical name.

5. The method according to claim 1 and further comprising:
    suspending routing SIP requests when a number of known logical names of SIP containers increases; and
    resuming routing SIP requests when a mapping of session key-based targeting (SKBT) keys is distributed for SIP application sessions, where the SKBT keys are mapped to SIP application session identifiers and session SIP container logical names.

6. The method according to claim 1 wherein determining the session SIP container further comprises:
    passing the SIP request to a session key-based targeting (SKBT) application programming interface (API) of the related SIP application;
    evaluating a key returned by the SKBT API to determine a logical name owned by the session SIP container; and
    causing the SIP request to be routed to the session SIP container that owns the logical name.

7. The method according to claim 6 wherein the evaluating comprises applying a predefined hash function modulo n to the key giving a result p, where n is a number of known logical names of session SIP containers, and wherein the causing comprises encoding a request uniform resource identifier (URI) of the SIP request to indicate the p-th logical name.

8. The method according to claim 7 wherein the SIP request is received from a SIP proxy server, and wherein the causing comprises resubmitting the SIP request with the encoded request URI to the SIP proxy server.

9. The method according to claim 8 wherein the causing comprises resubmitting the SIP request when the p-th logical name is not owned by the determined SIP container that received the SIP request.

10. The method according to claim 6 wherein:
    the SIP request is received from a SIP proxy server at the determined SIP container;
    the evaluating comprises searching for a SKBT key in a mapping of SKBT keys, where the SKBT keys are mapped to SIP application session identifiers and session SIP container logical names; and
    the causing comprises:
    modifying a request uniform resource identifier (URI) of a header of the SIP request to indicate a logical name of the session SIP container when the SKBT key maps to a SIP application session that is managed by the session SIP container; and
    sending the SIP request back to SIP proxy server for rerouting.

11. The method according to claim 6 wherein:
    the SIP request is received from a SIP proxy server at the determined SIP container, and the evaluating comprises:
        searching for a SKBT key in a mapping of SKBT keys, where the SKBT keys are mapped to SIP application session identifiers and session SIP container logical names; and
        applying a predefined hash function modulo n to the SKBT key giving a result p when the SKBT key does not map to a SIP application session, where n is a number of known logical names of session SIP containers; and
    the causing comprises:
        encoding a request uniform resource identifier (URI) of the SIP request to indicate the p-th logical name; and
        sending the SIP request back to the SIP proxy server for rerouting.

* * * * *